United States Patent Office 2,904,924
Patented Sept. 22, 1959

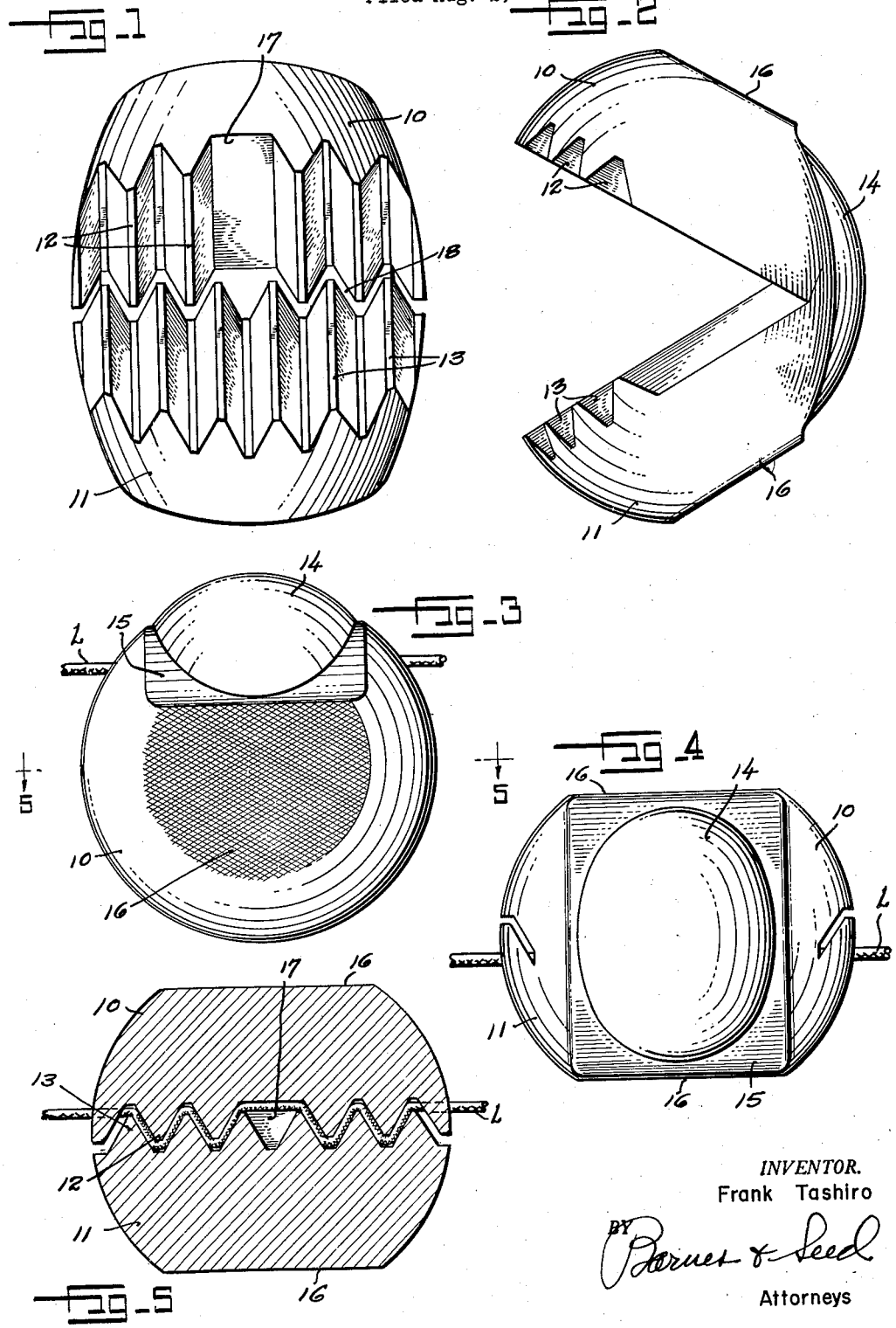

2,904,924

SHOT-TYPE FISHING SINKER

Frank K. Tashiro, Seattle, Wash.

Application August 2, 1957, Serial No. 675,851

2 Claims. (Cl. 43—44.89)

This invention relates to fishing sinkers, and particularly sinkers of the type generally known as "shot" composed of a ductile material, usually lead, having a generally spherical shape and, heretofore, split on a diameter of the body in a degree sufficient to partially bisect the same and form a dihedral angle which permits a fish line or leader to be inserted therein and pinched between the flanking faces. Split shot, and it is by this name that spherical sinkers presenting such dihedral angle have been commonly known, usually require a fairly considerable pressure in order that the same may be so pinched as to anchor the shot firmly in place. Heavy pressure, particularly when applied by pliers and in many instances even from the use of a fisherman's teeth to bite the shot, may seriously impair the strength of the line or leader to which the shot is applied. It is moreover difficult if not impossible to remove split shot from a line. It has therefore been the usual practice to discard the portion of the line to which the shot are attached, together with the shot thereon.

The present invention, as its general object, aims to provide a shot-sinker which will effectively perform the function for which split shot have been designed, one which can be applied to and removed from a fishing line or leader wtih ease and expedition, which can be reused sundry times, and which otherwise overcomes all of the disadvantages of split shot noted above.

Other more particular objects and advantages in view will, with the foregoing, appear and be understood in the course of the following description and claims, the invention consisting in the novel construction and in the adaptation and combination of parts hereinafter described and claimed.

In the accompanying drawing:

Figure 1 is a front elevational view portraying a shot-sinker constructed to embody the preferred teachings of the present invention and shown with the toothed jaws in an open condition.

Fig. 2 is a side elevational view thereof.

Fig. 3 is a top plan view of the shot-sinker with the jaws closed upon a fish line, such line being shown fragmentarily.

Fig. 4 is a rear elevational view of the closed shot-sinker; and

Fig. 5 is a vertical sectional view on line 5—5 of Fig. 3.

The shot-sinker of the present invention is made from a suitably ductile material, preferably lead, high on the atomic weight scale and molded to assume the normal shape illustrated in Figs. 1 and 2, and this is to say one presenting two jaw sections designated by the numerals 10 and 11 each formed to a truncated generally hemispherical shape and so joined, Siamese-like, that the bases lie in angled opposition and define a deep reentrant mouth. The jaw sections depart from a true truncated hemispherical shape in two important respects. One is the provision of interfitting teeth 12 and 13, respectively, in the upper and lower faces which define said mouth. The other is the provision of a cresting hump 14 along the back of the sinker developed as a moderately elongated segment of a sphere whose radius is substantially less than that of the hemispheres and so placed that its apex lies well outside the nominal profile of said hemispheres. A field 15 developed on a curved plane which, profile considered, more or less corresponds to a circumference of the hemispheres, outlines said hump. Said hump performs the function of a hinge and will be hereinafter so termed, its protrusion beyond the nominal profile of the hemispherical jaws permitting the indicated deep indentation of the mouth so that the sinker has a subtsantial lever arm when closing the jaws upon a fish line. The truncating of the hemispherical figures provides flats 16 to receive the fingers when applying said closing pressure, and to provide an augmented grip for such fingers the flats are knurled.

Reverting now to the teeth, it will be seen that the same are longitudinally disposed, running parallel to one another from the front to the rear end limit of the related jaw face. Other than for a central gap 17 which occurs between two of the teeth 12 in the upper jaw, each tooth 13 of the lower jaw registers with a mating tooth 12 in the upper jaw. The teeth are here shown as blunt edged but could be radiused if desired. It is desirable, see Fig. 1, that the root edges of the teeth 12 be separated from the root edges of the teeth 13 by a back wall 18 having a height, say, of $\frac{1}{32}''$ or thereabouts. When the sinker is closed upon a line, this back wall permits the surfaces of the mating teeth to converge toward the outer tips of the jaws and bring such tips into touching engagement. The function of the gap 17 is to accommodate a nail or other pointed instrument for forcing open the jaws when it is desired to detach the sinker from the line. It is to be noted that the line is protected against liability of damage from the entering point of such instrument in that the two center teeth 13 of the lower jaw hold the line against the roof of the gap 17, out of the path of the entering point.

The fish line is designated by the letter L. In Fig. 5 it will be seen that such line, when caught between the jaws, traces a steeply deflected serpentine path and hence requires only nominal pressure on the part of the jaws in order to establish the grip necessary to hold the sinker against shifting. This low required clamping pressure protects the line against damage. I find that teeth formed on the order of an American Standard thread, between 20 and 24 to the inch, are suitable for my purpose. The hinge for the present sinker, while requiring little mass, comparatively speaking, is distributed over a fairly substantial area and thus retains the rigidity which is necessary in order that the sinker may be reused through several opening and closing operations of the hinge.

It is thought that the invention will have been clearly understood from the foregoing detailed description of my now preferred illustrated embodiment. Changes in details of construction will suggest themselves and may be resorted to without departing from the spirit of the invention, wherefore it is my intention that no limitations be implied and that the hereto annexed claims be given the broadest interpretation to which the employed language fairly admits.

What I claim is:

1. A shot type fishing sinker composed of a readily deformable metal material and comprising two jaw sections having opposed faces integrally joined along a rim portion thereof so that said faces lie in angled opposition and produce a deeply indented mouth, the juncture functioning as a hinge permitting the mouth to be closed on a fish line by pressing the jaw sections together about said hinge as a swing axis, the opposed faces which define said mouth being each formed with multiple blunt teeth which extend approximately normal to the hinge axis for the full length of said faces and upon said closing of the mouth find a mating interfit, one of said jaw faces having at least one less centrally located tooth than the other said face to thereby produce a gap in the closed position of the jaw sections whereby a pointed instrument may be inesrted and leveraged for spreading the jaw sections to open the mouth.

2. A shot-type fishing sinker composed of a readily deformable metal material and comprising two generally hemispherical jaw sections having opposed faces integrally joined along a rim portion thereof so that said faces lie in angled opposition and produce a deeply indented mouth, the juncture functioning as a hinge permitting the mouth to be closed on a fish line by pressing the jaw sections together about said hinge as a swing axis, the opposed faces which define said mouth being each formed with multiple blunt teeth which extend approximately normal to the hinge axis for the full length of said faces and upon said closing of the mouth find a mating interfit, said sinker having a crested hump molded as an integral part there of to lap the hinge at the back thereof, said hump being developed as the approximate segment of a sphere whose radius is substantially less than that of said jaw sections and being placed so that its apex lies outside the normal hemispherical profile of said jaw sections.

References Cited in the file of this patent

UNITED STATES PATENTS

| | | |
|---|---|---|
| 300,263 | Jenks | June 10, 1884 |
| 2,531,003 | Slaker | Nov. 21, 1950 |

FOREIGN PATENTS

| | | |
|---|---|---|
| 199,280 | Great Britain | 1923 |
| 479,258 | Italy | 1953 |